(No Model.)

M. M. CAMP.
SHEET METAL AND CONCRETE PIPES FOR DRAINS, &c.

No. 246,597. Patented Sept. 6, 1881.

Witnesses:
W. B. Masson
J. H. Jacobson

Inventor:
Mortimer M. Camp
by Abraham and Mayer
Attorneys.

N. PETERS. Photo-Lithographer, Washington, D. C.

UNITED STATES PATENT OFFICE.

MORTIMER M. CAMP, OF NEW HAVEN, CONNECTICUT, ASSIGNOR TO THE ASPHALTED WROUGHT IRON PIPE COMPANY, OF NEW YORK, N. Y.

SHEET-METAL AND CONCRETE PIPE FOR DRAINS, &c.

SPECIFICATION forming part of Letters Patent No. 246,597, dated September 6, 1881.

Application filed July 11, 1881. (No model.)

*To all whom it may concern:*

Be it known that I, MORTIMER M. CAMP, a citizen of the United States, residing at New Haven, in the county of New Haven and State of Connecticut, have invented a new and useful Improvement in Sheet-Metal and Concrete Pipes for Drains, &c., that are intended to be lined and coated, of which the following is a specification.

The nature and object of my improvement are to provide a novel joint for connecting sections of metallic pipe that are to be afterward coated and lined, which, while making a close and tight joint, strengthens the united coated and lined pipe against peripheral pressure externally and internally, and prevents the joints of the sections being withdrawn or spreading longitudinally or otherwise.

Figure 1:
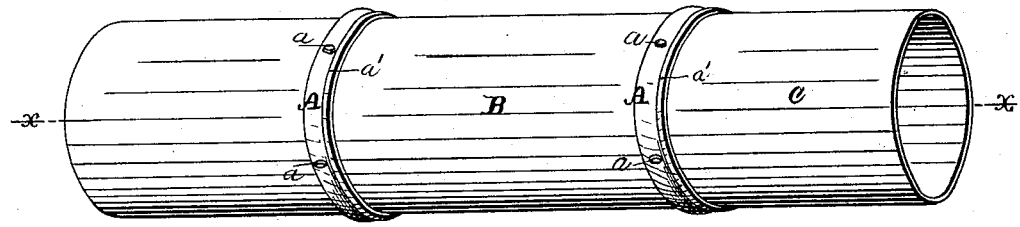
Figure 2:
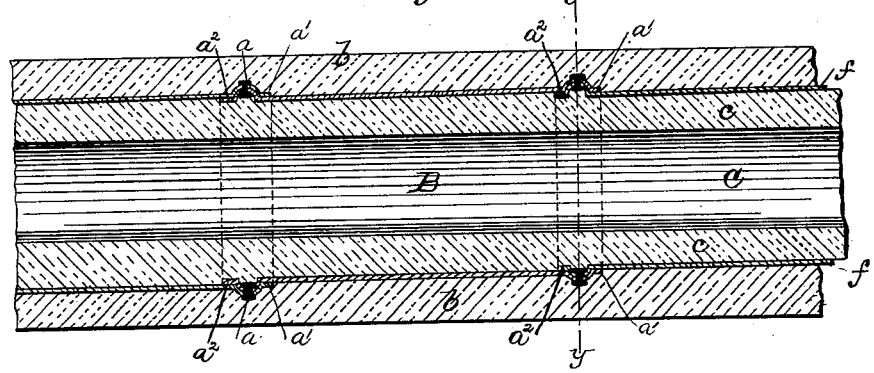
Figure 3:
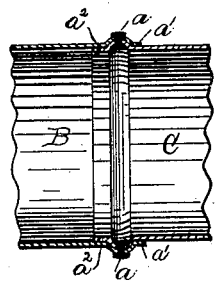
Figure 4:
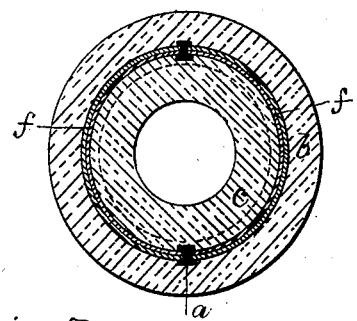
Figure 5:
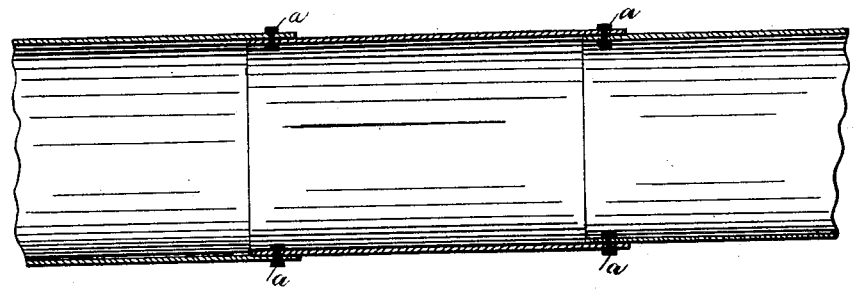

Referring to the accompanying drawings, in which similar letters of reference indicate like parts, Figure 1 represents a sheet-metal pipe uncoated and unlined, embodying my improvement. Fig. 2 is a longitudinal section of the same after being coated and lined. Figs. 3 and 4 are sectional views of Figs. 1 and 2 on the line $x\ y$ of each figure. Fig. 5 is a detail sectional view of the pipe in process of manufacture.

The sections of the pipe are first made in straight tubular form, and the ends intended to be joined are slipped flat one over the other, as shown in detail, Fig. 5. They are then connected with a few rivets, and the jointed pipe is then carried to a beading-machine of peculiar construction. (This machine is not herein described in detail, as it is embodied in another specification drawn up preparatory to making application for Letters Patent therefor, it being obvious that none of the ordinary beading-machines can be used for beading my improved pipe, in consequence of the projecting rivets $a$ and flanges $a'$ and $a^2$.) The overlapping joints are then pressed out, forming a bead, A. This bead does not take up all of the overlapping metal, but leaves beyond the relief-beaded portion flat flanges $a'\ a^2$, the flange $a'$ on section B surrounding and lying flat externally upon section C, the other flange, $a^2$, surrounding and lying flat internally against the inner face of section B, and so on with each succeeding section. My improved joint requires only a very small number of rivets. The pipe is then lined and coated with asphaltum, cement, or any similar composition. Fig. 2 is a sectional view of such finished pipe, wherein $f$ is the metal pipe, and $b\ c$ represent respectively the lining and coating.

Besides the advantage of my improvement as a device for joining sectional sheet-metal pipe, the beaded rims, with their internal and external flanges, form strengthening-ribs of overlapping metal, that re-enforce the pipe and protect it from circumferential pressure either externally or internally.

Having now fully described my invention, what I claim is—

1. The sectional sheet-metal pipe having overlapping joints first riveted together, and which joints are afterward pressed, so as to form the outwardly-projecting beads A and overlapping external and internal flat flanges, $a'\ a^2$, substantially as described.

2. In a sheet-metal pipe for lining and coating with cement, asphalt, or similar substance, the riveted beaded joint A, having external flat flanges, $a'$, and internal flat flanges, $a^2$, substantially as described.

3. In a jointed sectional sheet-metal pipe, the strengthening double metallic ribs formed by beading the overlapping ends of the several sectional joints, in combination with overlying external and internal flat flanges, all made from the body of the main tube without any additional pieces, as and for the purpose intended, substantially as described.

MORTIMER M. CAMP.

Witnesses:
V. M. OPPER,
ERNEST MARX.